(12) United States Patent
Lassota

(10) Patent No.: US 7,048,149 B1
(45) Date of Patent: May 23, 2006

(54) METHOD AND APPARATUS FOR MIXING BEVERAGE INGREDIENT POWDER IN A DRINK DISPENSER

(75) Inventor: Zbigniew G. Lassota, Long Grove, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 0 days.

(21) Appl. No.: 10/966,502

(22) Filed: Oct. 15, 2004

Related U.S. Application Data

(62) Division of application No. 10/217,220, filed on Aug. 12, 2002, now Pat. No. 6,837,397.

(60) Provisional application No. 60/316,699, filed on Aug. 31, 2001.

(51) Int. Cl.
*B67D 5/56* (2006.01)

(52) U.S. Cl. .................... 222/129.3; 222/63

(58) Field of Classification Search ............ 222/129.3, 222/66, 145.6, 146.5, 189.06, 413, 185.1, 222/129.4, 113, 236, 241, 246.2, 246.5, 129.1
See application file for complete search history.

(56) References Cited

U.S. PATENT DOCUMENTS

| | | | |
|---|---|---|---|
| 3,570,716 A * | 3/1971 | Kirsanoff et al. | 406/32 |
| 3,737,076 A * | 6/1973 | Gardner et al. | 222/146.2 |
| 4,324,494 A * | 4/1982 | Pryor et al. | 366/156.1 |
| 4,364,666 A * | 12/1982 | Keyes | 366/142 |
| 5,305,923 A * | 4/1994 | Kirschner et al. | 222/129.1 |
| 5,875,930 A * | 3/1999 | Nakajima et al. | 222/129.1 |
| 5,927,553 A * | 7/1999 | Ford | 222/129.4 |
| 5,931,343 A * | 8/1999 | Topar et al. | 222/56 |
| 6,202,894 B1 * | 3/2001 | Struminski et al. | 222/129.3 |

* cited by examiner

*Primary Examiner*—Lien M. Ngo
(74) *Attorney, Agent, or Firm*—James W. Potthast; Potthast & Associates

(57) ABSTRACT

A beverage powder mixing drink dispenser has a hopper for containing a supply of powder, a source of water and a controller, all contained within a housing has a mixing assembly, an electrical motor with an annular stator mounted to the housing and an annular rotor mounted to rotate around a motor axis within the annular stator when the stator is energized, a mixing chamber with a hollow body having an interior surface extending between a chamber inlet and a chamber outlet and at least one mixing member extending inwardly from and mounted to the interior surface to rotate with rotation of the hollow body, means for releasably mounting the hollow body of the mixing chamber to the rotor to rotate with the rotor relative to the stator about the motor axis, and means for controlling energizing of the stator, the accumulation of clogging moisture on the powder outlet is reduced by rotating the mixing member at a relatively high mixing speed during mixing to mix the powder with the water in the mixing chamber and rotating the mixing member at another relatively lower vent speed to draw air through the mixing member and away from the powder outlet during times that the mixing member is not being rotated at relatively high mixing speed to mix a drink.

22 Claims, 4 Drawing Sheets

METHOD AND APPARATUS FOR MIXING BEVERAGE INGREDIENT POWDER IN A DRINK DISPENSER

CROSS REFERENCE TO RELATED APPLICATION

This is a division of and claims under 35 USC120 the benefit of U.S. application Ser. No. 10/217,220 filed, Aug. 12, 2002, now U.S. Pat. No. 6,837,397 which, in turn, claims the benefit of U.S. provisional application No. 60/316,699, filed Aug. 31, 2001, under 35USC119(e).

BACKGROUND OF THE INVENTION

1. Field of the Invention

This invention generally relates to beverage mixing dispensers and more particularly to methods of mixing drinks in beverage mixing dispensers that mix beverage ingredient in powder form that is substantially completely dissolved with water to make the beverage.

2. Discussion of the Prior Art

Beverage mixing dispensers that mix beverage ingredient in powder form with water to make a beverage that is then dispensed are well known. Such equipment is often used in beverage vending machines to make such drinks as coffee, tea, cocoa or chocolate drinks, juice, broth, soup, etc. Such mixing dispensers generally comprise a hopper for containing the dry beverage ingredient powder, a mixing chamber with mixing blades for mixing the powder with water, a water tank or other source of water for mixing with the powder, a powder delivery system for delivering powder to the mixing chamber and a solenoid controlled valve for delivering water to the mixing chamber for mixing with the powder and a powder delivery system for delivering the powder to the mixing chamber for mixing with the water. The outlet of the mixing chamber has a solenoid controlled valve that is closed during mixing and then opened to drain the mixed drink from the mixing chamber and into a suitable container such as an individual serving cup. The powder delivery system may include a solenoid-controlled valve for controlling the outlet of the power hopper for selectively passing powder to the top of the mixing chamber. The amount of water passed to the serving cup is controlled by controlling the time that a water dispense valve is opened, and the amount of powder may be controlled by the length of time that the powder outlet valve is open.

A problem with the known beverage ingredient powder drink dispensers is that due to moisture, steam, water vapor, rising from the mixing chamber, the interior and the exterior of the outlet of the powder hopper often becomes moist and as a result powder fines will stick to the powder outlet and eventually clog the outlet such that none or a reduced amount of ingredient powder is dispensed into the mixing chamber. If varying amounts of powder are injected into the mixing chamber without a corresponding proportional varying of the water the strength of the resultant beverage disadvantageously varies. If the outlet becomes entirely clogged and blocked then the customer gets no beverage for his money put into a vending machine, for instance. Both results are disadvantageous, but the varying reduced strength which adversely affects both quality and uniformity is perhaps the most deleterious. Reduced beverage strength creates a negative impression directly associated with the drink itself as opposed to the dissatisfaction with only the mixing dispenser that is believed to be generally understood by the consumer to not be the fault of the maker of the powder drink ingredient.

Another problem with known beverage mixing dispensers is that the mixing chamber assembly may not be easily disassembled and is not designed to be disassembled or separated from the housing, or body, of the dispenser except by service trained service personnel. It is not removable by regular user employees who have neither the tools nor the technical expertise to disassemble the mixing chamber for purposes of visual and manual access or cleaning by regular maintainers of the dispensers that may, for instance, visit a vending dispenser on a daily or other periodic longer basis depending upon the level of usage. Consequently, parts of the mixing chamber do no get cleaned as frequently as they should, resulting in deleterious affects to the taste and quality or even possibly the health safety of the drinks being mixed. Alternatively, the task of frequent, such as daily regular cleaning of the mixing chamber assembly becomes prohibitively labor intensive and expensive.

SUMMARY OF THE INVENTION

It is therefore an objective of the invention to provide a beverage powder drink dispenser that ameliorates if not overcomes some or all of the problems and disadvantages of the known powder mixing drink dispensers noted above.

The objective is achieved in part by providing in a powder mixing drink dispenser having a source of water, a source of beverage ingredient powder and having a powder ingredient outlet, a mixing member within a mixing chamber for mixing water received within the chamber with powder received in the chamber to mix a drink, a method of reducing the accumulation of clogging moisture on the powder outlet by performing the steps of rotating the mixing member at a relatively high mixing speed during mixing to mix the powder with the water in the mixing chamber, and rotating the mixing member at another relatively lower vent speed to draw air through the mixing member and away from the powder outlet during times that the mixing member is not being rotated at relatively high mixing speed to mix a drink.

The objective is also achieved by providing in a beverage powder mixing drink dispenser having a hopper for containing a supply of dry beverage ingredient powder, a source of mixing water and a controller, all contained within a housing, a method of mixing by performance of the steps of rotating within an annular stator an annular rotor of an electrical motor mounted to the housing around a motor axis within the annular stator when the stator is energized, mounting a hollow body of a mixing chamber to the rotor to rotate with the rotor relative to the stator about the motor axis, said mixing chamber having a hollow body with an interior surface extending between a chamber inlet and a chamber outlet and at least one mixing member extending inwardly from and mounted to the interior surface to rotate with rotation of the hollow body, selectively passing dry ingredient powder and mixing water into the mixing chamber to be mixed together in the mixing chamber during rotation of the hollow body and mixing member when the stator is energized, and controlling energizing of the stator.

Additionally, the objective of the invention is obtained by providing a powder mixing drink dispenser having a source of water, a source of beverage ingredient powder and having a powder ingredient outlet, a mixing member within a mixing chamber for mixing water received within the chamber with powder received in the chamber to mix a drink with means means for rotating the mixing member at a relatively high mixing speed during mixing to mix the powder with the water in the mixing chamber, and means for rotating the mixing member at another relatively lower vent speed to draw air through the mixing chamber and away from the powder outlet during times that the mixing member is not being rotated at relatively high mixing speed to mix a drink.

BRIEF DESCRIPTION OF THE DRAWINGS

The foregoing advantageous features will be illustrated in detail and other advantageous features will be made apparent from the detailed description of an embodiment of the beverage powder mixing drink dispenser of the present invention which is given with reference to the several views of the drawings, in which.

DETAILED DESCRIPTION

Figure 1:
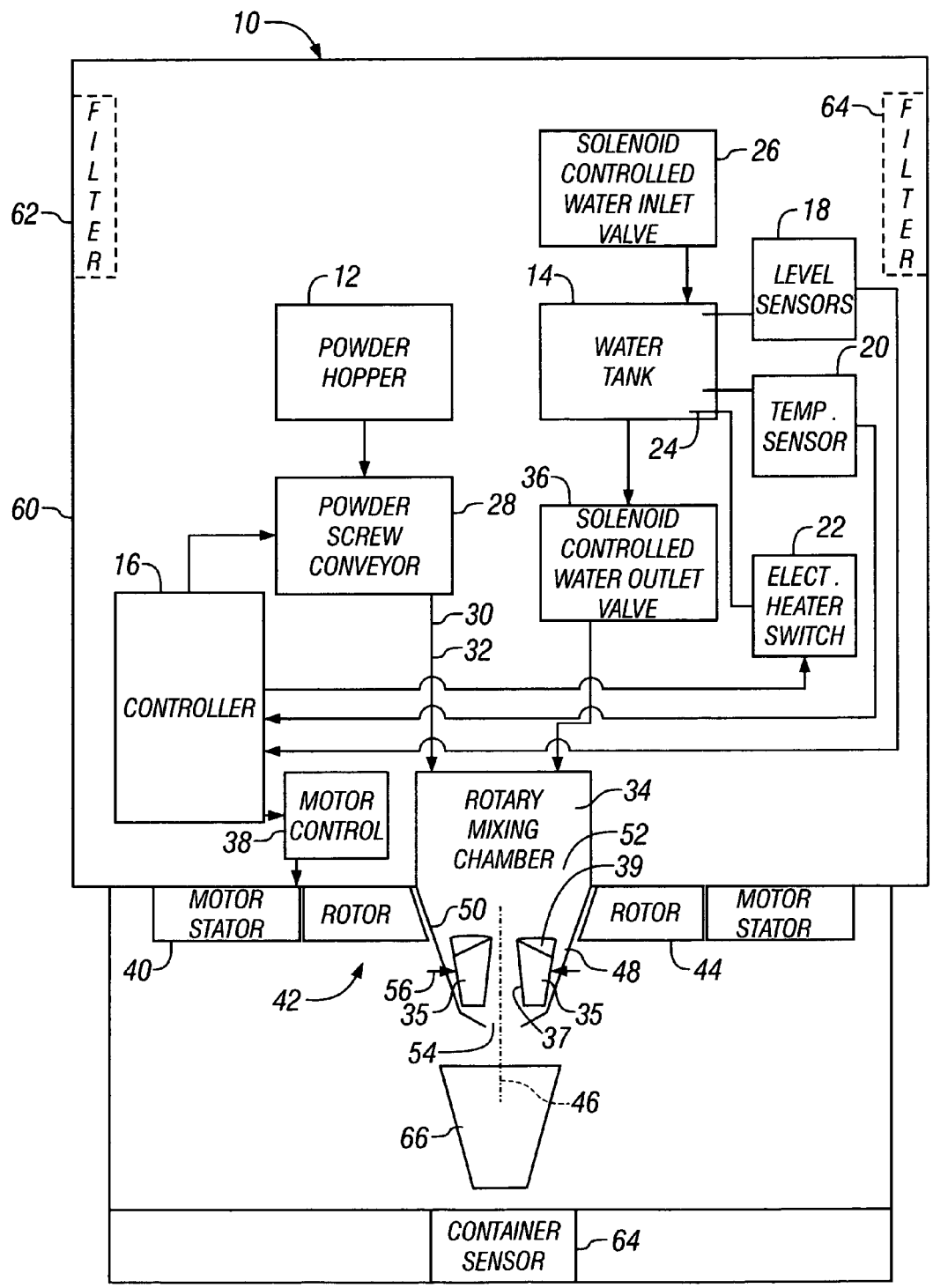
FIG. 1 is a functional block diagram of an embodiment of the beverage powder mixing dispenser of the present invention.

Referring to FIG. 1, the preferred embodiment of the beverage powder mixing drink dispenser 10 has at least one powder hopper 12 for containing a supply of dry beverage ingredient powder, a source of mixing water in a water tank 14 and a controller 16. Level sensors 18 detect the level of the water in the water tank 14. If the water level drops beneath a preselected minimum level, then the controller 16 actuates a solenoid controlled water inlet valve 26 that is connected to a public source of water through a hose (not shown) to add fresh water to the water tank 14. When the water level rises above another preselected level stored in the controller memory, the controller 16 deactuates the solenoid controlled valve 26 to stop the addition of new water to the water tank 14.

In the case of a hot beverage dispenser, a temperature sensor 20 senses the temperature of the water in the tank 14 and provides the sensed temperature to the controller 16. When the detected temperature decreases beneath a preselected minimum temperature stored in the controller memory, then the controller 16 actuates an electrical heater switch 22 to provide electrical power to an electrical heating element 24 to increase the temperature of the water. When the temperature rises above another preselected maximum temperature, then the controller deactuates the switch 22 to de-energized the heating element 24 and allow the water to cool.

The powdered beverage ingredient such as instant coffee, instant tea, or the like is contained within the powder hopper 12. When it is time to make a drink, the controller 16 actuates a powder screw conveyor 28. When actuated, the screw conveyor rotates and conveys a preselected quantity of ingredient powder at a preselected rate from the bottom of the hopper 12 to an inlet 30 of a drop chute 32. The conveyed powder falls through the drop chute and into the inlet opening of a rotary mixing chamber 34. The rotary mixing chamber 34 has a plurality of mixing members 35 spaced around the interior of the rotary mixing chamber 32.

At the same time the powder is added to the mixing chamber 34, a solenoid controlled water outlet valve 36 is actuated by the controller 16 to add a preselected quantity of water to the inlet of the mixing chamber 34 at a preselected rate. Concurrently, the controller actuates a motor control circuit, or motor control, 38 that, in turn, energizes a torroidal stator 40 of a variable speed motor 42. The variable speed motor 42 has an annular rotor 44 mounted for rotation within the stator 40 about a vertical motor axis 46. Releasably attached to and seated within the motor rotor 44 to rotate with the rotary mixing chamber 34. The rotary mixing chamber 34 has a hollow body 48 with an interior surface 50 having a generally conical or otherwise tapered surface extending between a chamber inlet 52 and a relatively narrow chamber outlet 54. The mixing members 35 extend inwardly from and are fixedly mounted to the interior surface 50 of the mixing chamber 34 and therefore rotate with rotation of the hollow body 48. The mixing members are preferably in the form of relatively thin walled vanes, or other blade like members that extend in a generally vertical direction with an upper slanted wing 39 for funneling the powder downwardly and inwardly to the vertical portion of the mixing members.

The hollow body 48 of the mixing chamber 34 is mounted to the rotor 44 to rotate with the rotor 44 relative to the stator 40 about the motor axis 46. During the rotation, the screw conveyor 28 and the solenoid controlled water outlet valve 36 are controlled by the controller 16 to selectively passing dry ingredient powder and mixing water into the mixing chamber 34 to be mixed together in the mixing chamber 34 during rotation of the mixing chamber 34 and the mixing members 35 when the stator 40 is energized by a signal to the motor control 38 to operate at a relatively high mixing speed.

As will be explained in greater detail below with respect to FIGS. 4–5, and as generally noted above, at least a lower part 37 of each of the substantially identical mixing members 34 has a generally vertical directional component for engaging the powder and water within the hollow body 48 for moving them both together toward the center of the hollow body 48 for mixing. Motion to the mixture is not imparted to the mixture by the relatively smooth interior surface 50 of the hollow body 48 that slides past the mixture while rotating in a relatively frictionless way. On the other hand, the mixing members 34 while being rotated with the hollow body 48 do impart violent and turbulent intermixing motion to both the powder and the water relative to the serving container as well as to the interior surface 50 and to each other. As the powder and water ingredients fall into the chamber 34 during rotation of the chamber 34 and the mixing members 34 they are received at different relative radial locations around the periphery of the mixing chamber inlet 52 and are moved together toward the central axis 46 for mixing and blending. As noted, at least an upper portion 39 of the mixing member has a fan-like shape. In addition to funneling any arrant powder or water inwardly and downwardly, the upper wing, or vane members, or upper members 39 function as fan vanes to direct air downwardly into the hollow body from the inlet 52, through the hollow body 48 and through the chamber outlet 54 at the bottom of the hollow body 48 to both cool and enhance intermixture of the ingredients with air flow.

Figure 2:
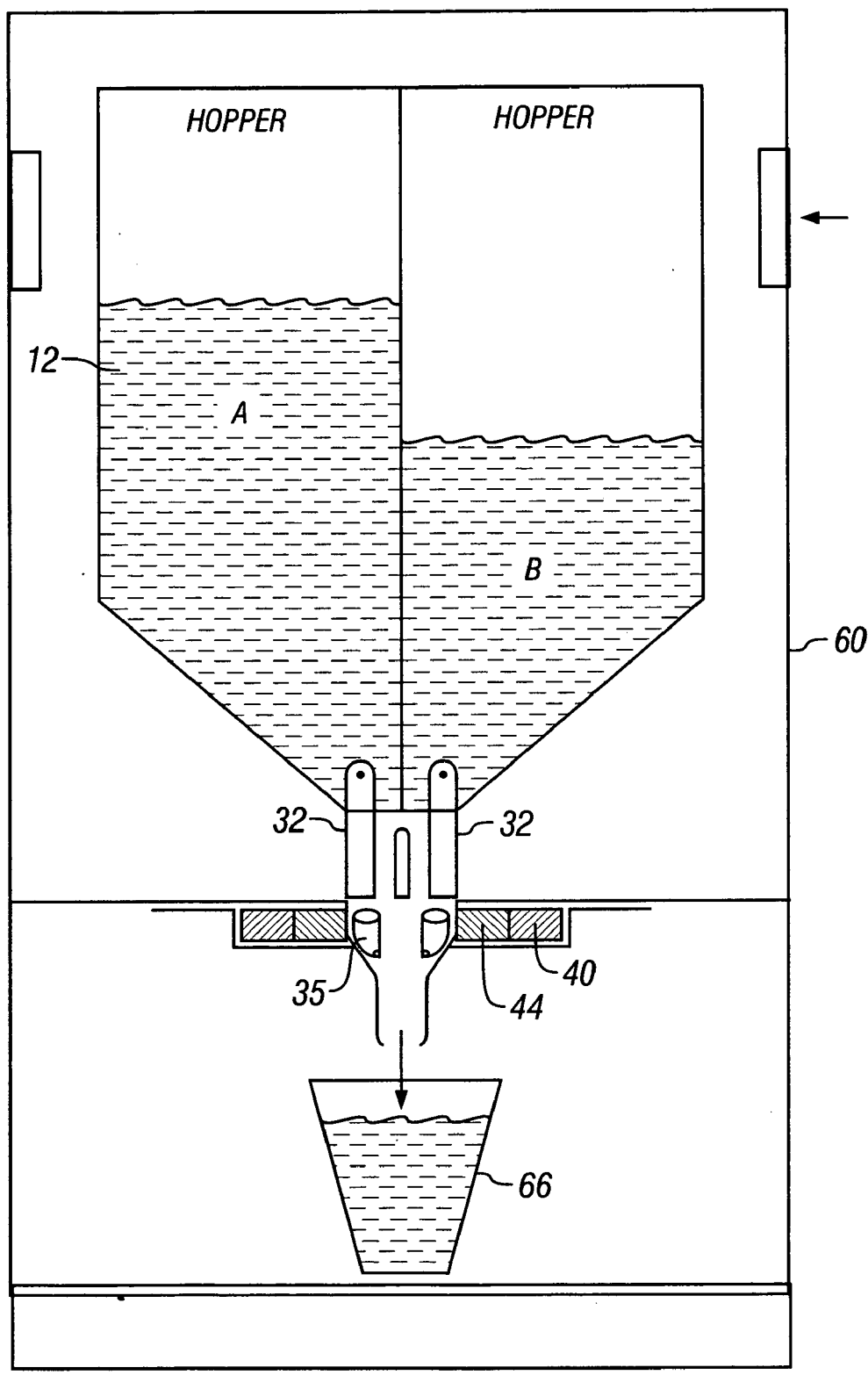
FIG. 2 is a schematic, front elevation, sectional view of the beverage powder mixing drink dispenser of FIG. 1.
Figure 3:
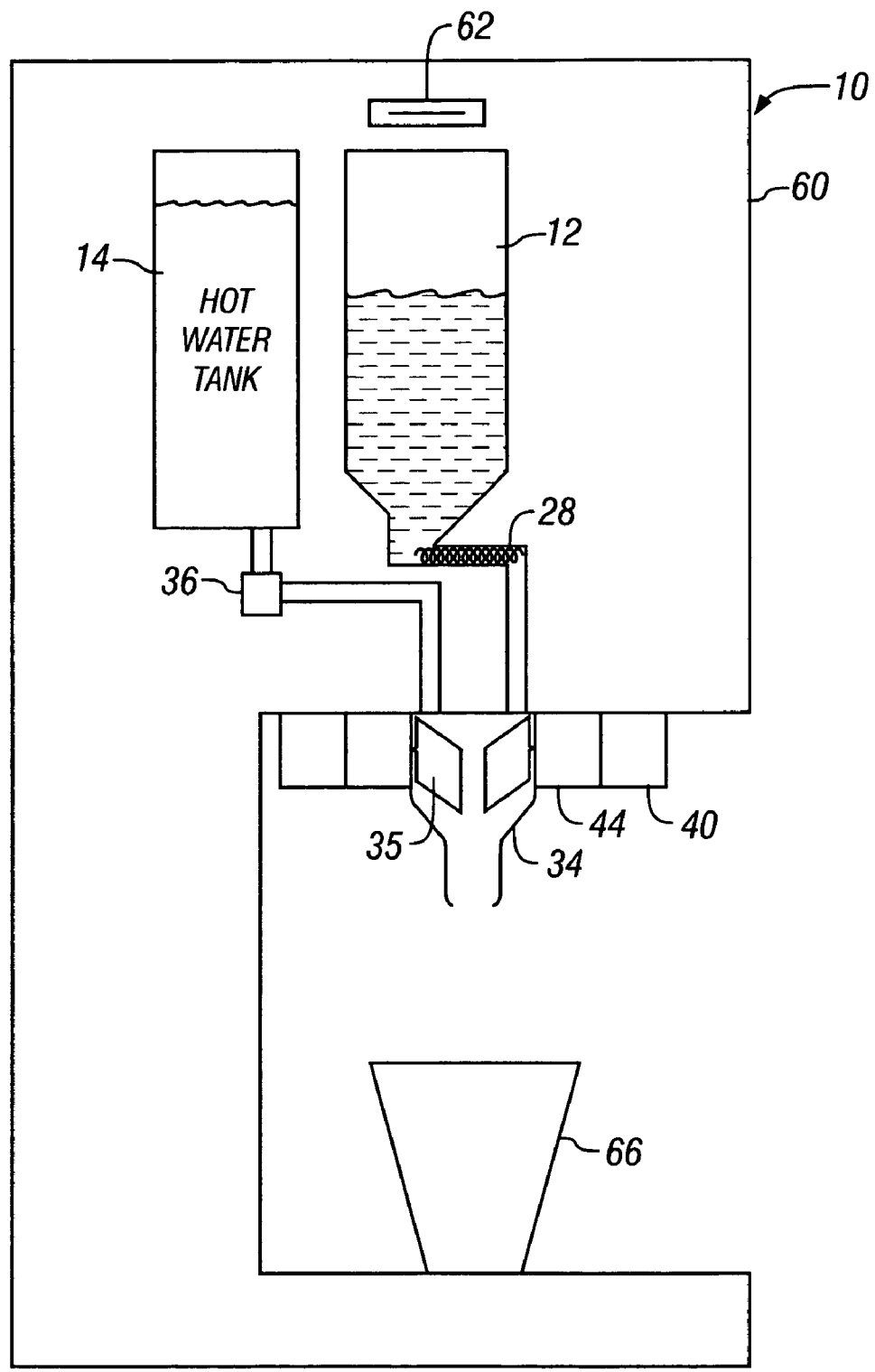
FIG. 3 is a schematic, side elevation, sectional view, of the powder mixing drink dispenser of FIG. 2.

The hollow body 48 is preferably releasably mounted to and nested within central opening of the annular rotor 44 to rotate with the rotor 44. Referring also to FIGS. 2 and 3, preferably the releasable mounting of the mixing chamber 34 to the rotor 44 is achieved by resilient fastener assemblies that automatically fasten the hollow body 48 to the rotor 44 when the hollow body 48 is inserted into an operative position relative to the rotor 44. For example, the fasteners may include mail latch members 49 with spherical heads that are slideably mounted within bores extend outwardly from either the inwardly facing surface of the rotor 44 and extend into mating vertical grooves 51 in the outwardly facing surface of the mixing chamber assembly 34. The mail latch members 49 are spring biased outwardly from the interior surface of the rotor 44 to be received within the mating vertical grooves 51, or other suitable detent, as seen in FIG. 3 and FIG. 4. Alternatively, the mating surfaces are roughened or otherwise prepared so as to not rotate relative to each other during normal operations.

The latch members 49 are cammed inwardly by the outside surface inwardly beveled portion of outside surface of the mixing chamber 34 as the mixing chamber is inserted into, or fitted into the annular seat of the rotor 44. The mixing chamber 34 is then rotated until the mating female recesses 51, grooves, hemispherical detents are reached and the latch members spring into latching engagement into the mating female recesses. Other releasable mounting may include mating grooves and slots of the rotor housing and the outside of the mixing chamber 34, respectively. In any event, the basic concept is that the mixing chamber hollow body 48 is mounted by some means that enables its releasable connection to the rotor 44 to rotate with the rotor and easy manual removal for cleaning, etc. without the use of any tools by unskilled personnel.

The controller controls the motor control 38 to selectively apply electrical power to the stator to selectively cause the rotor 44 to rotate at a mixing speed to mix the powder with the water, such as one thousand rpm and at a venting speed, much slower than the mixing speed, such as 50 rpm, to vent air downwardly through the hollow body 48 and away from the down tube 32 and particularly the outlet end of the down tube 32 to keep moisture and steam from condensing on and in the down tube 32. The elements of the mixing dispenser 10 discussed above are all contained within or mounted to a housing 60, FIG. 1. The housing preferably has a pair of filtered air inlet vents openings 62 and 64, as also seen in FIGS. 2 and 3, for receiving air within the housing and above the down tube 32, the outlet of the solenoid controlled water outlet, or dispensing, valve 36 and the mixing chamber inlet 52. During the rotational mixing process the rotation of the upper part 39 of each of the mixing members 35 act like a fan or propeller to force air downwardly away from the down tube 32 and powder screw conveyor 28.

When mixing is complete and the mixing chamber is empty of beverage or beverage being mixed, the controller automatically causes the motor control to continue to apply power to the motor stator to rotate the mixing chamber and the fan parts of the mixing members 35 to continue to draw air through the vents 62 and downwardly past the down tube 32 and the outlet of the water dispense valve 36 and through the hollow body 48 and out of the housing through the outlet opening 54 of the mixing chamber. A container sensor 64 senses when a container 66 is present. When the container 66 is present, the controller 16 operates the motor 42 at mixing speed, and when it is detected that the container 66 is not present, the controller 16 causes the mixing chamber and the fan portions of the mixing members to rotate at the relatively slower venting speed.

During mixing, the controller 16 causes the powder and water to be passed through the chamber inlet 52 adjacent a peripheral edge of the chamber inlet 52.

Figure 4:
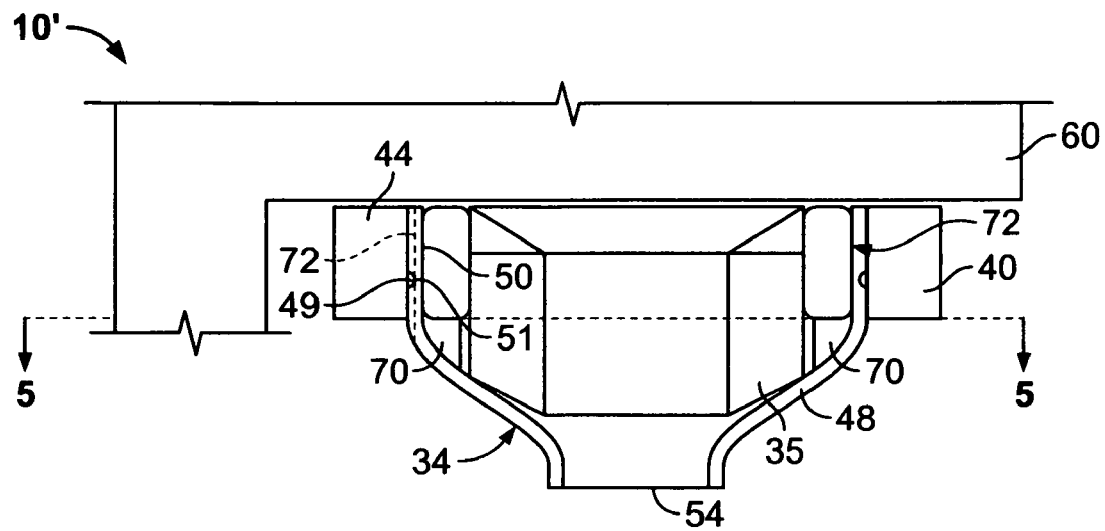
FIG. 4 is an enlarged portion of a side elevation view of another form of the powder mixing drink dispenser of the present invention that is the same as the form of FIGS. 1–3 but in which the rotor of a mixing motor carries the mixing members and rotates within the mixing chamber which remains stationary.
Figure 5:
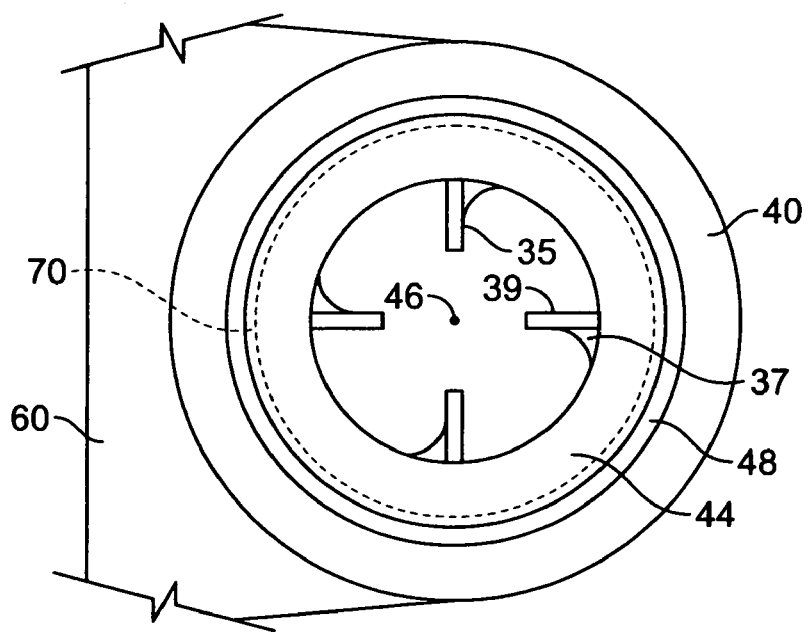
FIG. 5 is a plan sectional view taken through section line V—V of FIG. 4.

Referring to FIGS. 4 and 5, an alternative form 10' of the dispenser 10 of FIGS. 1–2 is shown that is identical to the form 10 except as describe below in which the same or corresponding parts have been given the same reference numeral. Unlike the dispenser 10, in the dispenser 10' the mixing chamber 34 does not rotate with the rotor. Instead of the mixing members 35 being releasably mounted directly to the interior surface 50 of the hollow body 48, they are releasably mounted to the interior surface of a suitable protective housing surrounding the annular rotor 44 and extend inwardly toward the center axis 46. The rotor 44 is mounted for rotation within the hollow body 48 and carries the mixing members for rotation within the mixing chamber 52. The electromagnetic field created by the stator 40 is sufficient to pass through the sides of the hollow body 48 and both support the sides of the rotor 44 away from the interior side 50 of the hollow body 48 and to propel the rotor 44 and mixing members 35 to rotate within the hollow body of the mixing chamber 34. Permanent magnets within the hollow body may provide underlying support at an annular ledge 70 to suspend the rotor 44 above the ledge for relatively frictionless support. Alternatively, the rotor is supported on an annular track atop the ledge 70 or elsewhere to enable its rotation relative to the interior of the hollow body 48. The hollow body 48 is nested within the central opening of the stator 40 and is releasably held in the nested position by means of suitable resilient fasteners carried by the stator and projecting into suitable detents 72 in the outer side of the hollow body 48. The mixing members may releasably mounted to the rotor 44 by means of mounting slots or the like or since the rotor is removable from the interior of the hollow body 48, the mixing members may be permanently attached to the protective enveloping housing around the rotor 44 and the entire rotor 44 and mixing members 35 removed together for cleaning.

Thus, it is seen that the dispensers 10 and 10' reduces the problem of clogging of the powder dispenser by providing in a powder mixing drink dispenser having a source of water, a source of beverage ingredient powder an having a powder ingredient outlet, a mixing member within a mixing chamber for mixing water received within the chamber with powder received in the chamber to mix a drink with a method of reducing the accumulation of clogging moisture on the powder outlet by performing the steps of (1) rotating the mixing member at a relatively high mixing speed during mixing to mix the powder with the water in the mixing chamber, and (2) rotating the mixing member at another relatively lower vent speed to draw air through the mixing member and away from the powder outlet during times that the mixing member is not being rotated at relatively high mixing speed to mix a drink. Preferably, the method includes the step of filtering the air vented through the mixing chamber before it passes the powder outlet. Preferably, the mixing member has a special fan-like portion that moves the air through the mixing chamber when rotating and another special mixing blade-like portion that impels the water and powder toward a central portion of the mixing chamber for mixing. Alternatively, two different blades are provided within the hollow body 48: one type for performing the fan function and another type for performing the mixing function.

As also seen the dispensers overcome the problem of inadequate cleaning of the mixing chamber 52 and mixing blades 35 by providing a rotary driven mixing chamber that also serves to drive the rotation of the fan portion and the mixing portion of the mixing member or by providing the dispenser with indirectly driven mixing members that are attached to a rotor releasably and rotatably mounted within the mixing chamber that enable easy removal of the mixing chamber and the mixing blades for cleaning without the use of tools or any mechanical skill.

While a particular mixing dispenser that embodies the invention has been disclosed in detail the scope of the invention is not limited by such details but is defined by the appended claims to which reference should be made to determine the scope of the invention.

The invention claimed is:

1. In a powder mixing drink dispenser having a source of water, a source of beverage ingredient powder and having a powder ingredient outlet, a mixing member within a mixing chamber for mixing water received within the chamber with powder received in the chamber to mix a drink, the improvement being a method of reducing the accumulation of clogging moisture on the powder outlet, comprising the steps of:
   rotating the mixing member at a relatively high mixing speed during mixing to mix the powder with the water in the mixing chamber; and
   rotating the mixing member at another relatively lower vent speed to draw air through the mixing member and away from the powder outlet during times that the mixing member is not being rotated at relatively high mixing speed to mix a drink.

2. The method of claim 1 including the step of filtering the air vented through the mixing chamber before it passes the powder outlet.

3. The method of claim 1 including the steps of
   moving the air through the mixing chamber by rotating a fan-like portion of the mixing chamber, and
   impelling the water and powder toward a central portion of the mixing chamber for mixing with a mixing-like portion of the mixing chamber.

4. The method of claim 1 in which the steps of rotating are by means of a motor with a generally vertical axis that rotates the mixing chamber about a vertical axis that is aligned with the generally vertical axis.

5. The method of claim 1 including the step of engaging the powder and water with at least a lower part of the mixing member having has vertical directional component to move the powder and water toward the center of the hollow body for mixing.

6. The method of claim 1 including the step of directing air downwardly into the hollow body and through an outlet at the bottom of the hollow body with at least an upper portion of the mixing member having a fan like shape.

7. The method of claim 1 including the step of releasably mounting a portion of mixing chamber to within the rotor to rotate with the rotor.

8. The method of claim 7 in which the releasable mounting means includes resilient fasteners that automatically releasably fasten the mixing chamber to the rotor when the mixing chamber is inserted into an operative position relative to the rotor.

9. The method of claim 8 in which the mixing chamber has a hollow body and including the step of releasably mounting the mixing member to the hollow body.

10. The method of claim 1 in which the mixing member is contained within a hollow body of the mixing chamber and including the step of releasably mounting the mixing member to the hollow body with a releasably mounting member.

11. The method of claim 1 including the step of controlling the application of electrical power to the stator of an electrical motor to selectively cause a rotor of the electrical motor to rotate at a mixing speed to mix the powder with the water and to rotate at a venting speed slower than the mixing speed to vent air downwardly through the mixing chamber and away from the selectively passing means.

12. The method of claim 1 in which the mixing chamber has an inlet adjacent a peripheral edge of the mixing chamber and including the step of selectively passing powder and water through the chamber inlet.

13. The method of claim 1 in which
   the mixing chamber has a hollow body with an interior surface, and including
   another mixing member extending inwardly from a portion of the interior surface of the hollow body spaced from the one mixing member.

14. The method of claim 13 including a third mixing member extending inwardly from a part of the interior surface of the hollow body spaced from both the one mixing member and the other mixing member.

15. The powder mixing drink dispenser of claim 1 including the step of directing air into the mixing chamber with a fan like portion of the mixing chamber when the hollow body is rotated.

16. The method of claim 15 including the step of receiving air from outside the housing for flow past a means for passing powder ingredient into the mixing chamber while the hollow body is rotated.

17. The method of claim 16 in which the air receiving means includes a vent opening extending through a portion of the housing located above the selective passing means.

18. The powder mixing drink dispenser of claim 16 in which the step of receiving air from outside the housing includes the step of filtering the air that is received within the housing.

19. The method of claim 1 including the step of selectively passing powder to the mxing chamber with a screw conveyor.

20. The method of claim 1 including the steps of
   sensing when a container is in a receiving position relative to the housing for receipt of the mixed beverage from the mixing chamber outlet, and
   stopping the passing powder or water to the mixing chamber inlet when a container is not sensed in said receiving position.

21. In a beverage powder mixing drink dispenser having a hopper for containing a supply of dry beverage ingredient powder, a source of mixing water and a controller, all contained within a housing, a method of mixing, comprising the steps of:
   rotating within an annular stator an annular rotor of an electrical motor mounted to the housing around a motor axis within the annular stator when the stator is energized;
   mounting a hollow body of a mixing chamber to the rotor to rotate with the rotor relative to the stator about the motor axis, said mixing chamber having a hollow body with an interior surface extending between a chamber inlet and a chamber outlet and at least one mixing member extending inwardly from and mounted to the interior surface to rotate with rotation of the hollow body;

selectively passing dry ingredient powder and mixing water into the mixing chamber to be mixed together in the mixing chamber during rotation of the hollow body and mixing member when the stator is energized;

controlling energizing of the stator.

22. In a powder mixing drink dispenser having a source of water, a source of beverage ingredient powder and having a powder ingredient outlet, a mixing member within a mixing chamber for mixing water received within the chamber with powder received in the chamber to mix a drink, the improvement, comprising:

means for rotating the mixing member at a relatively high mixing speed during mixing to mix the powder with the water in the mixing chamber; and means for rotating the mixing member at another relatively lower vent speed to draw air through the mixing chamber and away from the powder outlet during times that the mixing member is not being rotated at relatively high mixing speed to mix a drink.

* * * * *